United States Patent
Kidamura (10) Patent No.: US 9,513,680 B2
(45) Date of Patent: Dec. 6, 2016

(54) RELAYING DEVICE, RELAYING METHOD, AND POWER CONTROL SYSTEM

(71) Applicant: FUJITSU LIMITED, Kawasaki-shi, Kanagawa (JP)

(72) Inventor: Takashi Kidamura, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/065,578

(22) Filed: Oct. 29, 2013

(65) Prior Publication Data

US 2014/0173318 A1    Jun. 19, 2014

(30) Foreign Application Priority Data

Dec. 19, 2012 (JP) ................................. 2012-276674

(51) Int. Cl.
G06F 1/26        (2006.01)
G06F 1/28        (2006.01)

(52) U.S. Cl.
CPC .. *G06F 1/26* (2013.01); *G06F 1/28* (2013.01)

(58) Field of Classification Search
CPC ...................................... G06F 1/26; G06F 1/28
See application file for complete search history.

(56) References Cited

U.S. PATENT DOCUMENTS

| | | | | |
|---|---|---|---|---|
| 6,137,188 A * | 10/2000 | Mitchell | .................... | G06F 1/30 307/29 |
| 6,697,952 B1 * | 2/2004 | King | ......................... | G06F 1/26 327/538 |
| 7,908,496 B2 * | 3/2011 | Rodriguez | ................ | G06F 1/26 713/300 |
| 7,932,639 B2 * | 4/2011 | Ma | ......................... | G11O 5/147 307/18 |
| 8,615,670 B2 * | 12/2013 | Feng | ......................... | G06F 1/26 702/64 |
| 2002/0109489 A1 * | 8/2002 | Shaver | ...................... | G06F 1/26 323/283 |
| 2004/0128565 A1 * | 7/2004 | Horigan | .................. | G06F 1/266 713/300 |

(Continued)

FOREIGN PATENT DOCUMENTS

JP    2000-316036    11/2000
JP    2001-320390    11/2001

(Continued)

OTHER PUBLICATIONS

Japanese Office Action mailed Jul. 19, 2016 in related Japanese Application No. 2012-276674.

*Primary Examiner* — Jaweed A Abbaszadeh
*Assistant Examiner* — Brian J Corcoran
(74) *Attorney, Agent, or Firm* — Staas & Halsey LLP (57) ABSTRACT

A relaying device for relaying serial communication that couples an upper level device and a power supply controller, the relaying device includes: a control information transmitter configured to, in response to receiving control information that is output from the upper level device to the power supply controller, transmit the control information, the control information being associated with power control; and a monitoring and controlling unit configured to monitor and control a control value to be transmitted to the power supply controller based on the control information transmitted from the control information transmitter.

18 Claims, 6 Drawing Sheets

(56) References Cited

U.S. PATENT DOCUMENTS

| | | | |
|---|---|---|---|
| 2005/0194958 A1* | 9/2005 | Morse | G06F 1/28 323/351 |
| 2006/0041763 A1 | 2/2006 | Borkar et al. | |
| 2008/0294924 A1* | 11/2008 | Morrell | G06F 11/30 713/340 |
| 2010/0169701 A1* | 7/2010 | Tu | G06F 1/3203 713/600 |
| 2011/0087900 A1* | 4/2011 | Lakhanpal | G06F 1/3203 713/300 |
| 2012/0326692 A1 | 12/2012 | Koizumi et al. | |
| 2014/0025979 A1 | 1/2014 | Yagi et al. | |
| 2014/0380070 A1* | 12/2014 | Hua | G06F 1/26 713/320 |

FOREIGN PATENT DOCUMENTS

| | | |
|---|---|---|
| JP | 2008-510253 | 4/2008 |
| JP | 2009-94550 | 4/2009 |
| WO | 2011/080841 A1 | 7/2011 |
| WO | 2012/137411 A1 | 10/2012 |

* cited by examiner

RELAYING DEVICE, RELAYING METHOD, AND POWER CONTROL SYSTEM

CROSS-REFERENCE TO RELATED APPLICATION

This application is based upon and claims the benefit of priority of the prior Japanese Patent Application No. 2012-276674, filed on Dec. 19, 2012, the entire contents of which are incorporated herein by reference.

FIELD

The embodiments discussed herein are related to a relaying device, a relaying method, and a power control system.

BACKGROUND

In a Control Module (CM) that includes a Central Processing Unit (CPU) and a power supply controller and is equipped within a storage device, a power supply voltage of the CPU is controlled based on a VID (Voltage Identification) signal that the CPU provides to the power supply controller. The power supply controller provides the CPU with the power supply voltage according to the VID value provided from the CPU. In providing the VID value from the CPU to the power supply controller, parallel VID signals are transmitted by using an asynchronous parallel VID bus including eight signal lines. In addition, monitoring a VID signal and testing a voltage margin may be performed between the CPU and the power supply controller.

With recent improvements in the performance of CPUs, it is under consideration to use a synchronous serial VID bus allowing a clock signal, a data signal, or an alarm signal to be transmitted and received between a CPU and a power supply controller, instead of the asynchronous parallel VID bus. Data flowing on the conventional asynchronous parallel VID bus is merely a VID signal notification command transmitted from the CPU to the power supply controller. However, in the synchronous serial VID bus, a power supply controller information acquisition command is transmitted from the CPU to the power supply controller in addition to the VID value notification command as described above, while a reception response command is transmitted from the power supply controller to the CPU. As such, a variety of information flows in both directions. In addition, the CPU may need to receive the reception response command from the power supply controller within a specified period of time after a corresponding command is transmitted to the power supply controller.

Related art is disclosed in Japanese Laid-open Patent Publication No. 2001-320390, Japanese Laid-open Patent Publication No. 2009-94550 and Japanese Laid-open Patent Publication No. 2000-316036.

However, although the asynchronous parallel VID bus between the CPU and the power supply controller is simply replaced with the synchronous serial VID bus, such a CM has a problem in that data signals are not transmitted from the power supply controller to the CPU. In addition, since the CPU does not receive data signals from the power supply controller, there is also a problem that the CPU erroneously recognizes the power controller to be in an abnormal state even when the power supply controller is in a normal state.

SUMMARY

According to an aspect of the embodiments, a relaying device for relaying serial communication that couples an upper level device and a power supply controller, the relaying device includes: a control information transmitter configured to, in response to receiving control information that is output from the upper level device to the power supply controller, transmit the control information, the control information being associated with power control; and a monitoring and controlling unit configured to monitor and control a control value to be transmitted to the power supply controller based on the control information transmitted from the control information transmitter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Relaying methods, relaying devices, and power control systems will be described below with reference to accompanying drawings. However, the following embodiments are presented as examples and are not intended to exclude various modifications or technical applications that are not explicitly disclosed in the embodiments. Thus, the embodiments may be practiced while being modified in different ways (combining the embodiments and individual modifications, and the like) without departing from the scope of their spirit.

Further, each drawing is not intended to include only the elements depicted in the drawing but may include other functions and the like.

[A] First Embodiment

Figure 1:
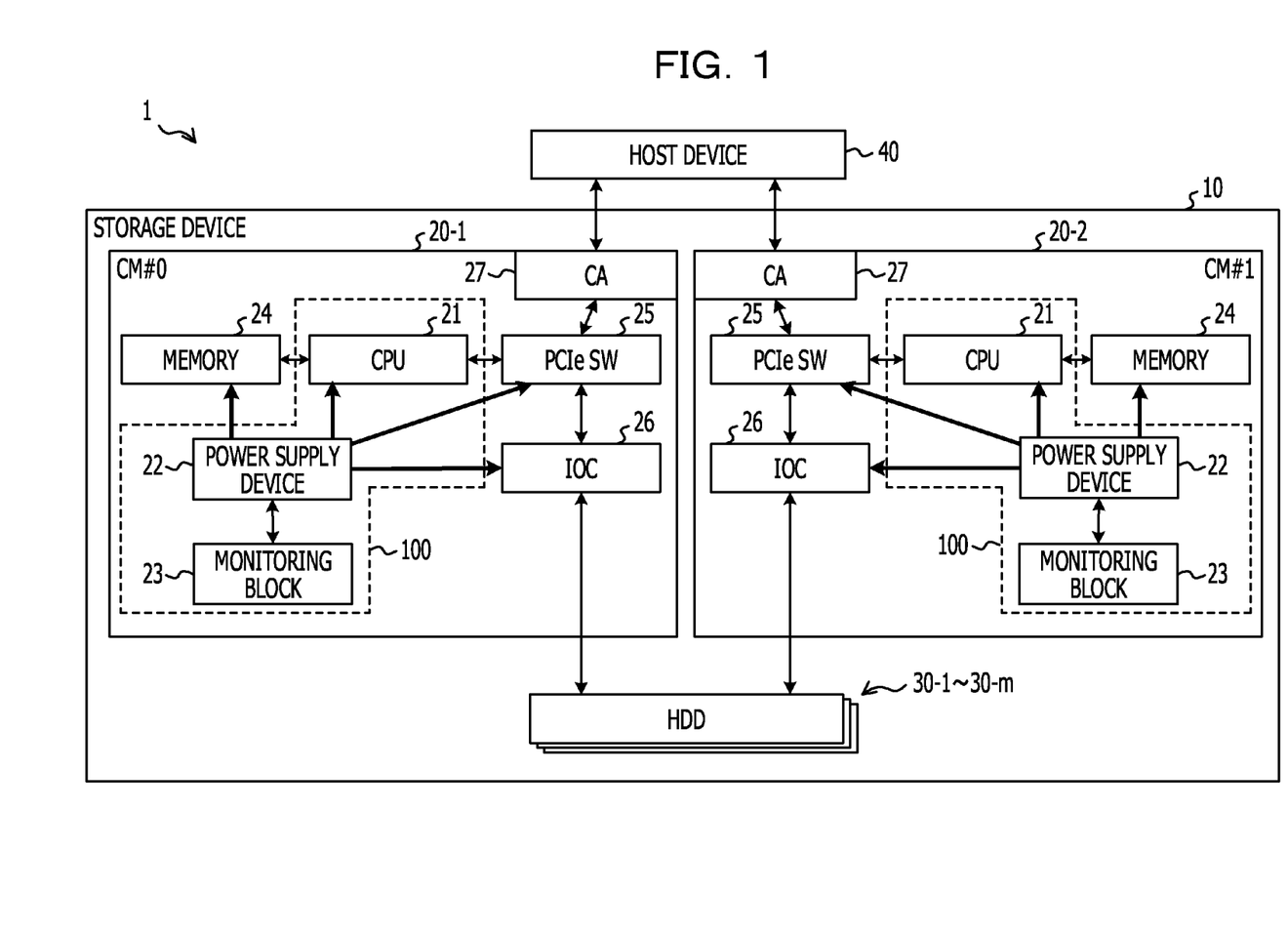
FIG. 1 is an example illustrating a hardware structure of a storage system including a power control system, according to an embodiment of the present disclosure.
Figure 2:
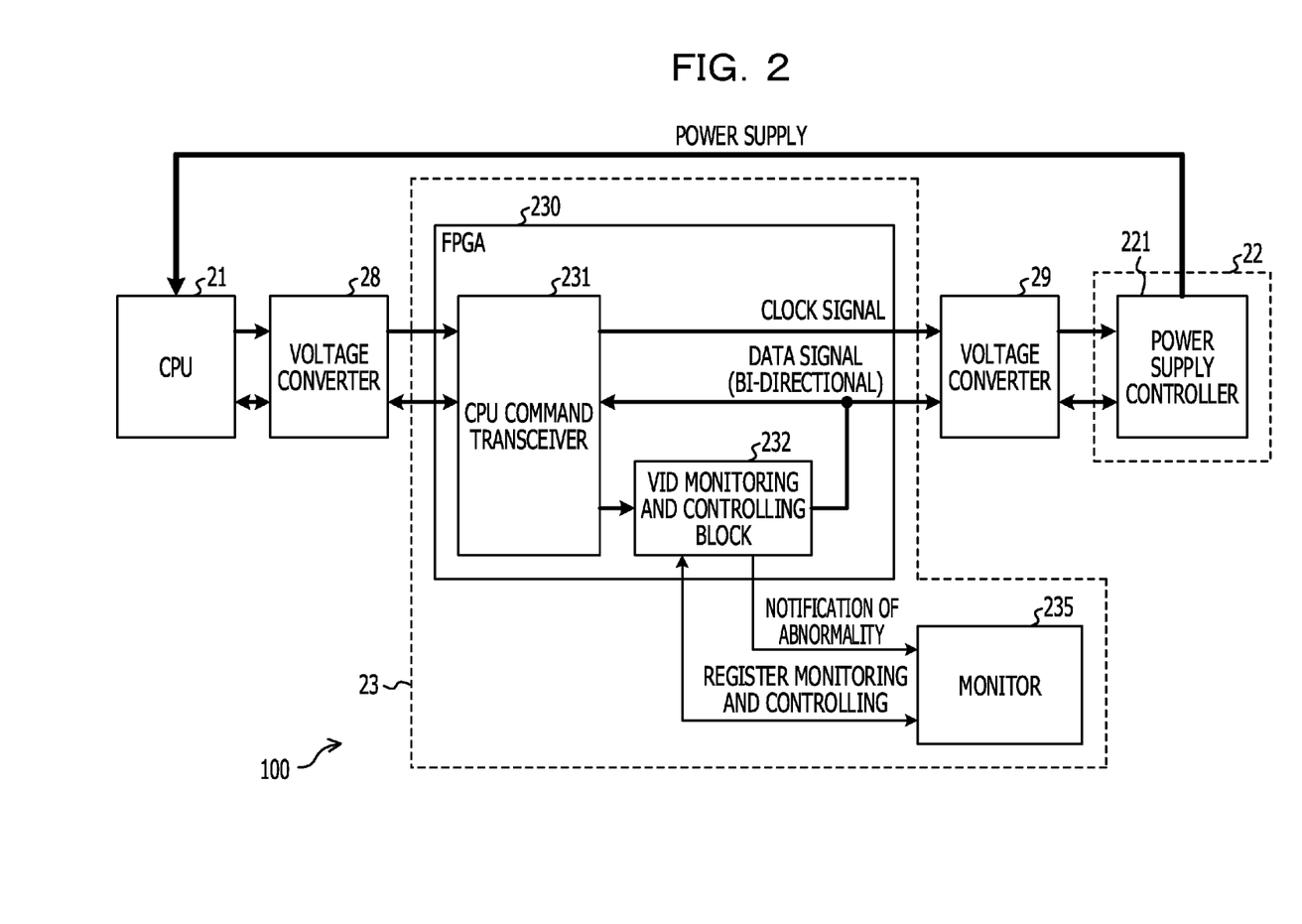
FIG. 2 is an example illustrating a functional configuration of an Field Programmable Gate Array (FPGA) in a power control system, according to a first embodiment of the present disclosure.
Figure 3:
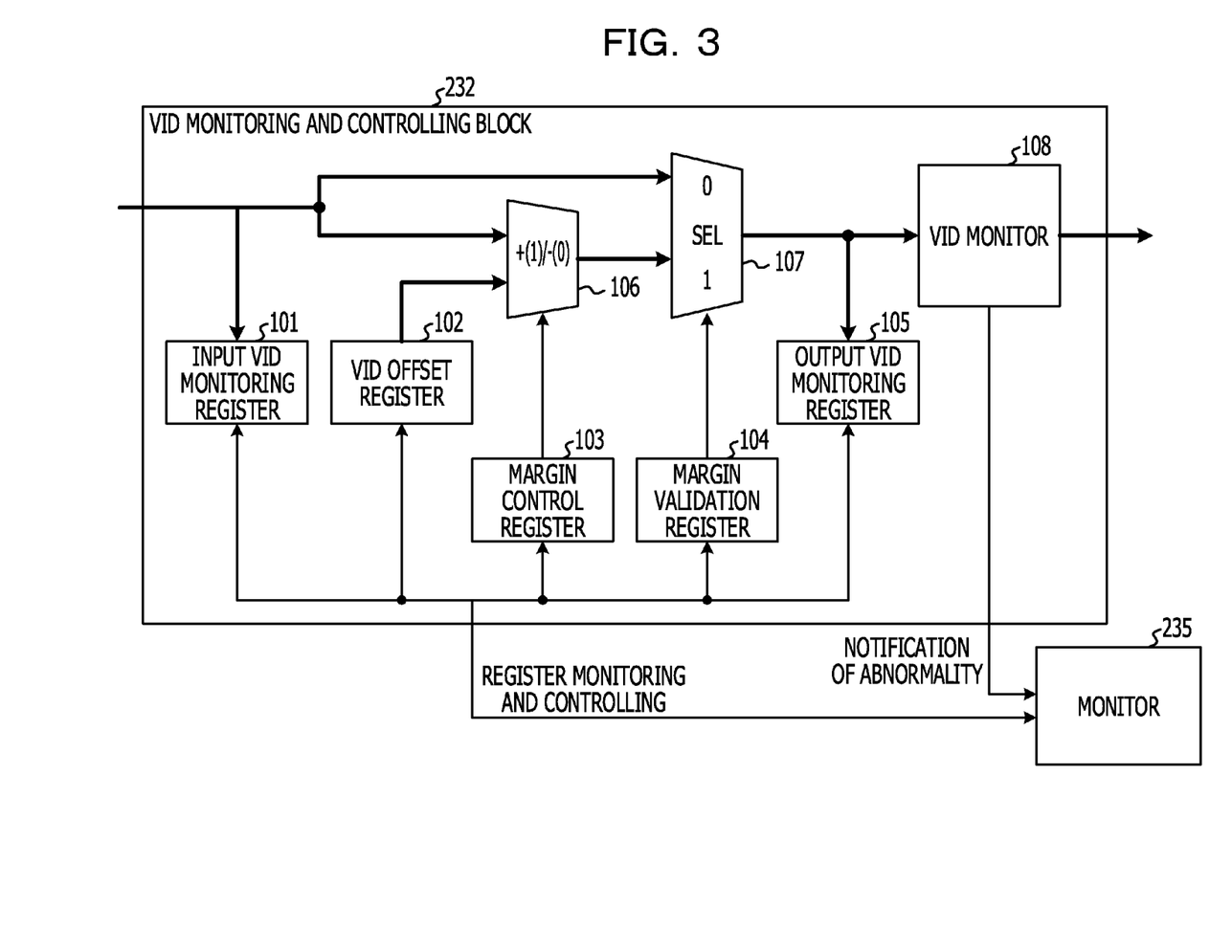
FIG. 3 is an example illustrating a functional configuration of a VID monitoring and controlling block in a FPGA of a power control system, according to the first embodiment of the present disclosure.

FIG. 1 is an example illustrating a hardware structure of a storage system including a power control system, according to an embodiment of the present disclosure. FIG. 2 is an example illustrating a functional configuration of an FPGA in a power control system, according to a first embodiment of the present disclosure. FIG. 3 is an example illustrating a functional configuration of a VID monitoring and controlling block in a FPGA of a power control system, according to the first embodiment of the present disclosure.

As illustrated in FIG. 1, a storage system 1 includes a storage device 10 and a host device 40. The storage system 1 is configured to provide a memory area for the host device 40. The host device 40 may be a computer (information processing device) equipped with a server function. Although one host device 40 is provided in the example of FIG. 1, without being limited thereto, two or more host devices 40 may be provided.

The storage device 10 includes CMs (control modules) 20-1 and 20-2 and a plurality of hard disk drives (HDDs) 30-1 to 30-$m$. The storage device 10 may be, for example, a Redundant Arrays of Independent Disks (RAID) device and manage the plurality of HDDs 30-1 to 30-$m$ as a single memory device. In the following description, CM 20-1 and CM 20-2 may be referred to as CM #0 and CM #1, respectively.

In addition, although a particular CM is denoted by CM 20-1, CM #0, CM 20-2, or CM #1, an arbitrary CM may be denoted by "CM 20" in the following description. In addition, although a particular HDD is denoted by one of reference numerals 30-1 to 30-$m$, an arbitrary HDD may be denoted by reference numeral 30 in the following description.

The HDD 30 may be a memory device storing data in a writable and readable manner. In the example illustrated in FIG. 1, m memory devices having substantially the same or similar configuration are provided. The CM 20 may be a control device configured to perform a variety of controls in response to storage access requests (access control signal: hereinafter, referred to as "host I/O") from the host device 40. In the example illustrated in FIG. 1, two CMs 20 having substantially the same or similar configuration are provided.

The CM 20 includes a CPU 21, which may correspond to an upper level device, a power supply device 22, a monitoring block 23, which may correspond to a relaying device, a memory 24, a Peripheral Component Interconnect Express Switch (PCIeSW) 25, an Input/Output Controller (IOC) 26, and a Channel Adapter (CA) 27. The CPU 21, the memory 24, the PCIeSW 25, the IOC 26, and the CA 27 are interconnected in a communicable manner via, for example, bus lines.

In addition, as depicted in FIG. 2, the CPU 21 and the power supply device 22 are coupled by a synchronous serial VID bus in a communicable manner via an FPGA 230 and voltage converters 28 and 29, which will be described below. This synchronous serial VID bus includes a clock signal line from the CPU 21 to the power supply device 22 and a bi-directional data communication line, as illustrated in FIG. 2.

The CPU 21 may be a processing device performing a variety of controls and operations to implement various functions by executing an Operating System (OS) and programs stored in the memory 24. In addition, the CPU 21 may function to transmit a clock signal to a power supply controller 221 and functions to communicate serial VID data signals with the power supply controller 221. The serial VID data signals include commands transmitted from the CPU 21 such as a VID value notification command (control information) and a power supply controller information acquisition command. Further, the serial VID data signals include commands received by the CPU 21 such as a power supply controller information notification command.

The memory 24 may be a memory device including a Read Only Memory (ROM) and a Random Access Memory (RAM). The ROM of the memory 24 stores an OS, software programs, and data for these programs. The software programs in the memory 24 are properly read and executed by the CPU 21. The RAM of the memory 24 may be used as a primary recording memory or a working memory.

The PCIeSW 25 may be an interface module that communicates with, for example, another CM 20 via a PCIe bus. The IOC 26 performs data transfer between the HDD 30 and the CM 20 and is implemented by, for example, a dedicated chip. The CA 27 may be an interface controller that interconnects the host device 40 and the CM in a communicable manner.

The power supply device 22 may be a known device providing power, supplied from an external device, to the CPU 21, the monitoring block 23, the memory 24, the PCIeSW 25, the IOC 26, and the CA 27, and includes the power supply controller 221, as depicted in FIG. 2. The power supply controller 221 controls power to be provided to each device in the CM 20, such as the CPU 21 and the like. For example, the power supply controller 221 sets a power supply voltage based on a VID value (control value) provided from the CPU 21, and provides the power supply voltage to the CPU 21 and the like. An example of providing the power supply voltage to the CPU 21 will be described below.

The monitoring block 23 may be a device that relays data communication between the CPU 21 and the power supply controller 221, and includes an FPGA 230, which may correspond to a relay device, and a monitor 235 as depicted in FIG. 2. The voltage converters 28 and 29 are provided between the CPU 21 and the monitoring block 23 and between the monitoring block 23 and the power supply controller 221, respectively, as illustrated in FIG. 2. The voltage converter 28 converts a signal from the CPU 21 into a voltage that can be processed by the FPGA 230. In addition, the voltage converter 29 converts a signal from the FPGA 230 into a voltage that can be processed by the power supply controller 221. In one example of this embodiment, the voltage converters 28 and 29 may be omitted. The voltage converters 28 and 29 may be well-known devices for converting a voltage and thus, a detailed explanation for them will be omitted.

The monitor 235 may monitor and control each register in a VID monitoring and controlling block 232 of the FPGA 230 (which will be described below). In addition, the monitor 235 receives an abnormality notification related to a VID value from a VID monitor 108 (referring to FIG. 3) in the VID monitoring and controlling block 232 (which will be described below). Upon receiving the abnormality notification from the VID monitor 108, the monitor 235 stops the operation of the power supply controller 221.

The FPGA 230 may be an integrated circuit whose configuration can be arbitrarily set, and includes a CPU command transceiver 231, which may correspond to a control information transmitter and a response processor, and the VID monitoring and controlling block 232, which may correspond to a monitoring and controlling unit, as illustrated in FIG. 2. The CPU command transceiver 231 may receive a command from the CPU 21 and determine whether or not the received command is a VID value notification command. If it is determined that the received command is the VID value notification command, the CPU command transceiver 231 transmits the received command to the VID monitoring and controlling block 232. On the other hand, if it is determined that the received command is a command other than the VID value notification command, the CPU command transceiver 231 transmits the received command to the power supply controller 221 via the voltage converter 29. Determination on the kinds of commands may be made by referring to, for example, headers of the commands. In addition, the CPU command transceiver 231 receives the clock signal from the CPU 21 and then transmits it to the voltage converter 29. Furthermore, the CPU command transceiver 231 receives a response command from the power supply controller 221 and transmits it to the CPU 21.

The VID monitoring and controlling block 232 may perform monitoring and voltage margin controlling for the VID value notified by the CPU 21. As described in FIG. 3, the VID monitoring and controlling block 232 includes an input VID monitoring register 101, which may correspond to a holding unit, a VID offset register 102, a margin control register 103, a margin validation register 104, an output VID monitoring register 105, a calculator 106, a selector 107, and the VID monitor 108. An asynchronous parallel VID bus may be used within the VID monitoring and controlling block 232. Accordingly, a serial-to-parallel converter is provided at an input side of the VID monitoring and controlling block 232 to convert a serial signal input from the voltage converter 28 into a parallel signal. On the other hand, a parallel-to-serial converter is provided at an output side of the VID monitoring and controlling block 232 to convert a parallel signal output from the FPGA 230 into a serial signal.

The monitoring and controlling (updating) of the values of the input VID monitoring register 101, the VID offset register 102, the margin control register 103, the margin validation register 104, and the output VID monitoring register 105 may be performed by the monitor 235, as described above. The input VID monitoring register 101 holds the VID value output by the CPU 21. The VID offset register 102 holds a margin that is added to or subtracted from the VID value output by the CPU 21. The margin is set by the monitor 235, as described above. For example, an operator may set the margin in the monitor 235 in an arbitrary manner.

The margin control register 103 holds information on whether to add the margin held by the VID offset register 102 to the VID value output from the CPU 21 or subtract it from the VID value. For example, the margin control register 103 holds "1" as a value for adding the margin and holds "0" as a value for subtracting the margin. By the calculator 106, the margin set in the VID offset register 102 is added to or subtracted from the VID value output from the CPU 21. For example, if the margin control register 103 holds the information for adding the margin (e.g., the value "1"), the calculator 106 adds the margin held by the VID offset register 102 to the VID value output from the CPU 21 and transfers a result of the addition to the selector 107. In contrast, if the margin control register 103 holds the information for subtracting the margin (e.g., the value "0"), the calculator 106 subtracts the margin held by the VID offset register 102 from the VID value output from the CPU 21 and transfers a result of the subtraction to the selector 107.

The margin validation register 104 holds information on whether to validate or invalidate the resultant value obtained by adding or subtracting the margin to or from the VID value. For example, the margin validation register 104 may hold "1" as a value for validating the margin-added/subtracted value and "0" as a value for invalidating the margin-added/subtracted value. The selector 107 selects and outputs one of a signal output from the CPU 21 and a signal output from the calculator 106. For example, if the margin validation register 104 holds the information for validating the margin-added/subtracted VID value (e.g., the value "1"), the selector 107 selects the value output from the calculator 106 (i.e., the margin-added/subtracted VID value) and transfers this value to the output VID monitoring register 105 and the VID monitor 108. In contrast, if the margin validation register 104 holds the information for invalidating the margin-added/subtracted VID value (e.g., the value "0"), the selector 107 selects the VID value output from the CPU 21 (the VID value where the margin is neither added nor subtracted) and transfers this value to the output VID monitoring register 105 and the VID monitor 108.

The output VID monitoring register 105 holds the VID value output from the selector 107 (i.e., the VID value output from the CPU 21 or the margin-added/subtracted VID value). The VID monitor 108 holds an upper limit value and a lower limit value of the VID value provided to the power supply controller 221 as threshold values in advance. If the VID value output from the selector 107 is beyond the upper limit value or below the lower limit value, the VID monitor 108 notifies abnormality to the monitor 235. In contrast, if the VID value output from the selector 107 is between the upper limit value and the lower limit value, the VID monitor 108 provides the VID value to the power supply controller 221 via the voltage converter 29.

Then, the power supply controller 221 provides the CPU 21 with power based on the VID value output from the VID monitoring and controlling block 232. In this manner, the CPU 21, the power supply device 22, the monitoring block 23, and the voltage converters 28 and 29 may constitute a power control system 100. Thus, the power control system 100 is operated as follows.

The CPU 21 transmits the VID value notification command, which is a VID data signal in the form of a serial signal, to the voltage converter 28. The voltage converter 28 converts the received signal into a voltage which can be processed by the FPGA 230 and transmits it to the CPU command transceiver 231. The CPU command transceiver 231 detects the VID value notification command from the received signal and transmits the detected command to the VID monitoring and controlling block 232.

The VID monitoring and controlling block 232 performs monitoring of the VID value and transmits the VID value, on which the voltage margin control is performed, to the voltage converter 29. In this configuration, the monitor 235 properly changes information held by the VID offset register 102, the margin control register 103, and the margin validation register 104 while monitoring the input VID monitoring register 101 and the output VID monitoring register 105.

The voltage converter 29 converts the received signal into a voltage which can be processed by the power supply controller 221 and transmits it to the power supply controller 221. The power supply controller 221 sets the power supply voltage based on the received VID value and provides the power supply voltage to the CPU 21. In this manner, the FPGA 230 according to the first embodiment allows data to be efficiently transmitted from a power controller to a CPU via a synchronous serial VID bus.

In addition, since the VID monitoring and controlling block 232 and the monitor 235 monitor the VID value provided by the CPU 21, it is possible to notify the power supply controller 221 of a proper VID value and also perform a voltage margin test. Further, since the CPU command transceiver 231 determines whether or not the command received from the CPU 21 is the VID value notification command, it is possible to directly transmit a command other than the VID value notification command to the power supply controller 221 while transferring the VID value notification command to the VID monitoring and controlling block 232.

Furthermore, since the CPU command transceiver 231 transmits the response command, which is received from the power supply controller 221, to the CPU 21, it is possible to bi-directionally exchange data signals between the CPU 21 and the power supply controller 221.

[B] Second Embodiment

A storage system according to the second embodiment of the present disclosure has substantially the same functional configurations as the storage system 1 according to the first embodiment of the present disclosure as depicted in FIG. 1.

Figure 4:
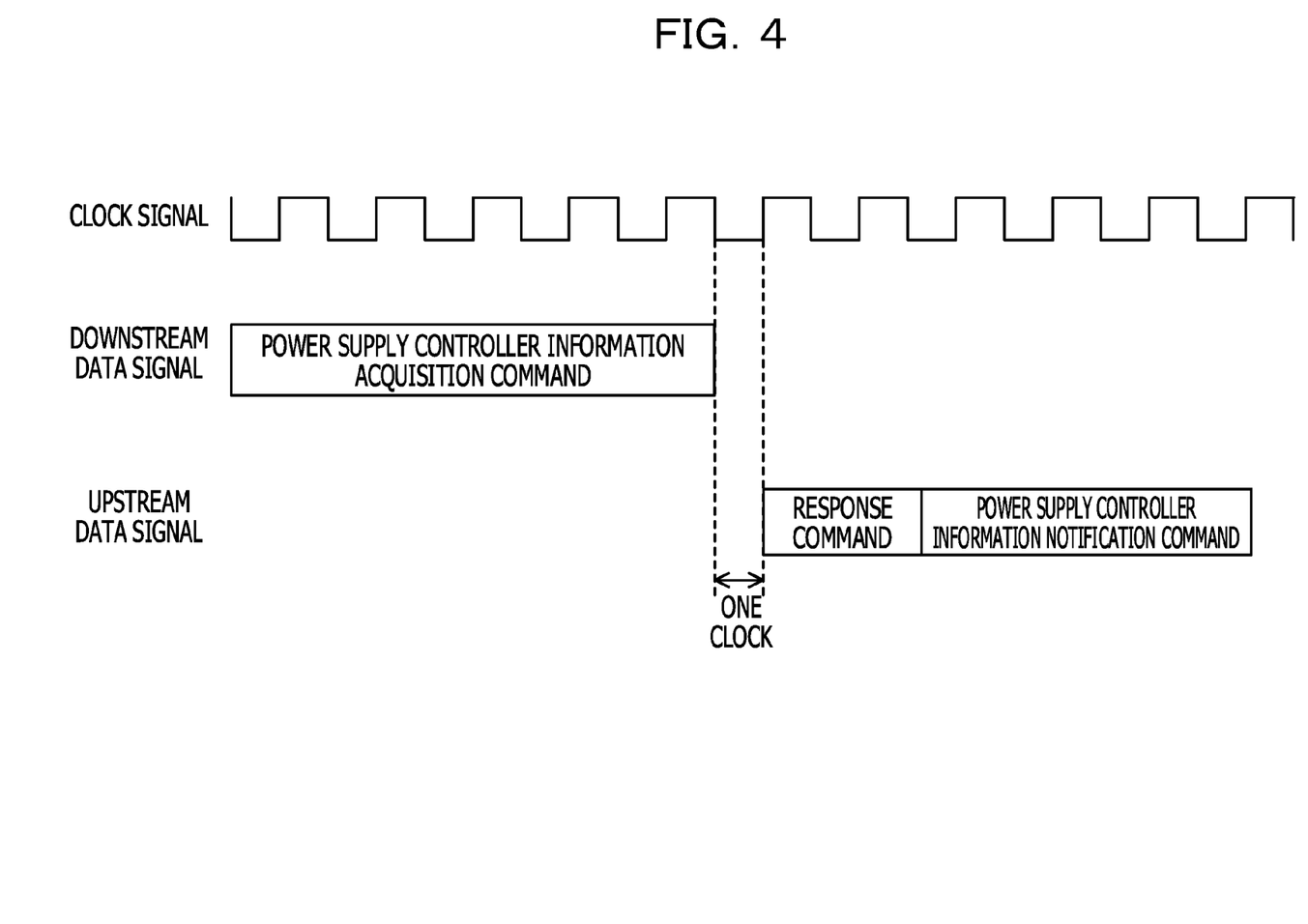
FIG. 4 is an example illustrating timings of transmitting and receiving commands in a power control system, according to an embodiment of the present disclosure.
Figure 5:
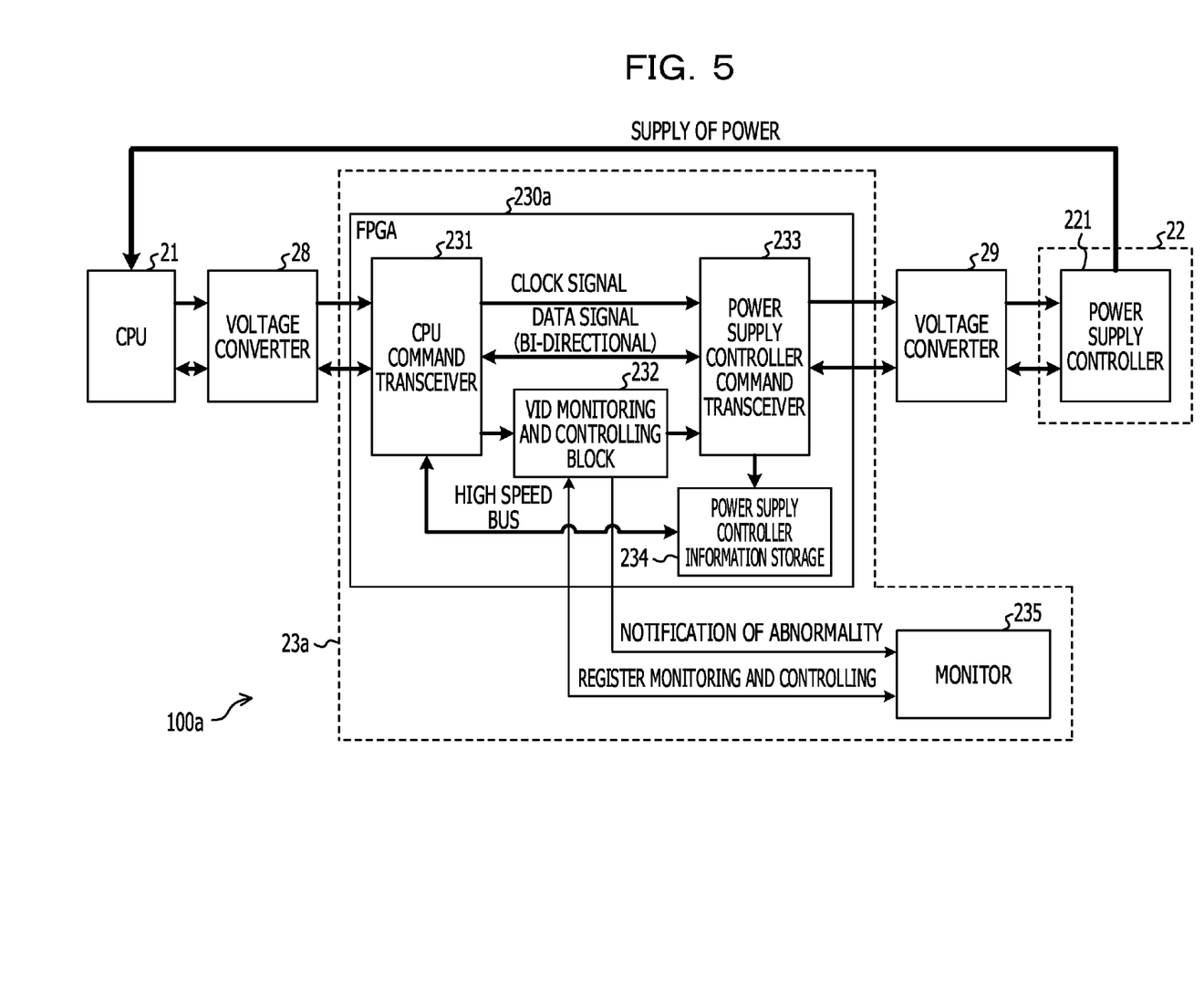
FIG. 5 is an example illustrating a functional configuration of an FPGA in a power control system, according to a second embodiment of the present disclosure.

An FPGA 230a in a power control system according to the second embodiment is configured to perform a response to the CPU 21 within a certain period of time. FIG. 4 is an example illustrating timings of transmitting and receiving commands in a power control system, according to this embodiment. FIG. 5 is an example illustrating a functional configuration of the FPGA 230a in a power control system according to the second embodiment, which is included in a monitoring block 23a.

In these drawings, the same reference numerals as the earlier-described figures denote the same or corresponding elements as the earlier-described ones and thus, explanation of those will not be repeated. Commands from the CPU 21 to the power supply controller 221 may include, for example, a VID value notification command and a power supply controller information acquisition command (a command relating to a request for acquiring information). In the following descriptions, commands other than the VID value notification command and the power supply controller information acquisition command are referred to as other commands. The other commands may include, for example, a CPU power status notification command and a register read/write command to the power supply controller 221.

Exchanging of commands between the CPU 21 and the power supply controller 221 via the synchronous serial VID bus may need to be performed with a gap of one clock interval, as illustrated in FIG. 4. For example, if the CPU 21 attempts to acquire information on the power supply controller 221, the CPU 21 transmits the power supply controller information acquisition command as a downstream data signal (i.e., from the CPU 21 to the power supply controller 221). After one clock interval from transmitting the power supply controller information acquisition command, the CPU 21 receives the response command and the power supply controller information notification command from the power supply controller 221 as upstream data signals (i.e., from the power supply controller 221 to the CPU 21). If a delay occurs in transmitting the response command from the power supply controller 221 to the CPU 21, exchanging of the data signals between the CPU 21 and the power supply controller 221 may not be performed successfully. For example, in the synchronous serial VID bus, a delay may occur between the FPGA 230 and the power supply controller 221.

For example, in the power control system 100 according to the above-described first embodiment, there is a possibility that the CPU 21 may not receive the power supply controller information notification command due to the delay in the FPGA 230. As illustrated in FIG. 5, the FPGA 230a according to the second embodiment includes a power supply controller command transceiver (control value transmitter and storage processor) 233 and a power supply controller information storage (information storage) 234, in addition to the CPU command transceiver 231 and the VID monitoring and controlling block 232 of the first embodiment.

The CPU command transceiver 231 and the power supply controller information storage 234 are interconnected by a high speed bus in which only a negligible delay may occur. The CPU command transceiver 231 may have a function to transmit the response command to the CPU 21 upon receiving a command from the CPU 21, in addition to the functions of the CPU command transceiver 231 according to the first embodiment. Further, if the command received from the CPU 21 is the VID value notification command, the CPU command transceiver 231 transfers the command to the VID monitoring and controlling block 232. In addition, if the command received from the CPU 21 is the power supply controller information acquisition command, the CPU command transceiver 231 acquires power supply controller information from the power supply controller information storage 234 and provides the information to the CPU 21. Furthermore, if the signal received from the CPU 21 is the other commands or the clock signal, the CPU command transceiver 231 transfers the other commands or the clock signal to the power supply controller command transceiver 233.

The power supply controller command transceiver 233 receives the VID value notification command from the VID monitoring and controlling block 232 and transmits it to the power supply controller 221 via the voltage converter 29. For example, the power supply controller command transceiver 233 transmits a control value to the power supply controller 221. In addition, the power supply controller command transceiver 233 receives the clock signal and the other commands from the CPU command transceiver 231 and transmits them to the power supply controller 221 via the voltage converter 29. In addition, the power supply controller command transceiver 233 may acquire the information of the power supply controller 221 from the power supply controller 221 on a regular basis and store the information in the power supply controller information storage 234. In this configuration, the information of the power supply controller 221 indicates, for example, a vendor ID or an error status of the power supply controller 221.

In this manner, the FPGA 230a according to the second embodiment can provide the following effects, in addition to substantially the same operations and effects as those of the first embodiment. When the CPU command transceiver 231 receives a command from the CPU 21, no delay may occur in returning the response command to the CPU 21. In addition, the power supply controller command transceiver 233 acquires the power supply controller information from the power supply controller 221 in advance and stores the information in the power supply controller information storage 234. Since the CPU command transceiver 231 directly acquires the power supply controller information from the power supply controller information storage 234, there may be no occurrence of a delay in the transmission of the power supply controller information notification command to the CPU 21.

[C] Third Embodiment

A storage system according to the third embodiment of the present disclosure has substantially the same functional configurations as the storage system 1 according to the first embodiment of the present disclosure depicted in FIG. 1. An FPGA 230b in the power control system according to the third embodiment, which is included in a monitoring block 23b, transmits the response command to the CPU 21 within a specified period of time, like the FPGA 230a in the power control system according to the second embodiment.

Figure 6:
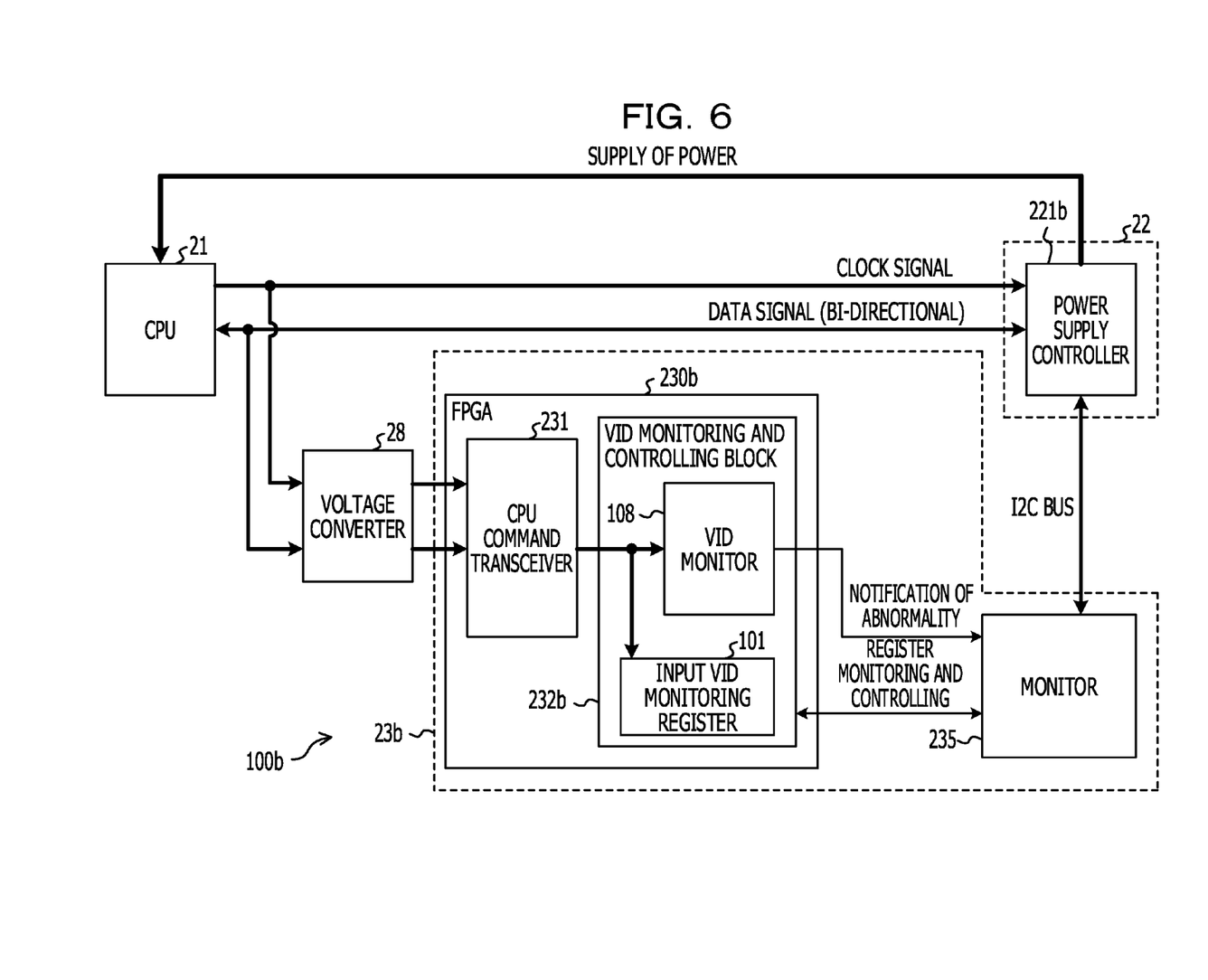
FIG. 6 is an example illustrating a functional configuration of an FPGA in a power control system, according to a third embodiment of the present disclosure.

FIG. 6 is an example illustrating a functional configuration of a FPGA in a power control system according to the third embodiment. In an example of the third embodiment, the FPGA 230b and the voltage converter 28 may not be provided between the CPU 21 and a power supply controller 221b, unlike the first embodiment.

For example, the CPU 21 and the power supply controller 221b are directly interconnected by a synchronous serial VID bus, as illustrated in FIG. 6. Accordingly, various commands such as a clock signal and a data signal are directly transmitted from the CPU 21 to the power supply controller 221b. In addition, both the clock signal and the data signal lines in the synchronous serial VID bus are branched to the voltage converter 28 between the CPU 21 and the power supply controller 221b.

As depicted in FIG. 6, the power supply controller 221b and the monitor 235 are coupled by an I2C (inter-integrated circuit) bus. The power supply controller 221b may have a function to control the VID value transmitted from the CPU 21, in addition to the function of the power supply controller 221 according to the first embodiment. For example, the power supply controller 221b has the functions of the VID offset register 102, the margin control register 103, the margin validation register 104, the output VID monitoring register 105, the calculator 106, and the selector 107. The VID offset register 102, the margin control register 103, the margin validation register 104, and the output VID monitoring register 105 are controlled by the monitor 235 via the I2C bus.

The CPU command transceiver 231 may transfer only the VID value notification command among the commands received from the CPU 21 to a VID monitoring and controlling block 232b. The FPGA 230b includes the CPU command transceiver 231 and the VID monitoring and controlling block 232b, similar to the FPGA 230 according to the first embodiment. However, unlike the VID monitoring and controlling block 232 according to the first embodiment, the VID monitoring and controlling block 232b may include the input VID monitoring register 101 and the VID monitor 108, without the VID offset register 102, the margin control register 103, the margin validation register 104, the output VID monitoring register 105, the calculator 106, and the selector 107. For example, the VID monitoring and controlling block 232b according to the third embodiment may monitor only the VID value received from the CPU 21.

The input VID monitoring register 101 holds the VID value output from the CPU 21, like the input VID monitoring register 101 according to the first embodiment. The VID monitor 108 holds the upper limit value and lower limit value of the VID value to be transmitted to the power supply controller 221b. If the VID value sent from the CPU 21 is beyond the upper limit value or below the lower limit value, the VID monitor 108 notifies abnormality to the monitor 235.

In this manner, the FPGA 230b according to the third embodiment can provide the following effects, in addition to substantially the same operations and effects as those of the first embodiment. A circuit configuration of the FPGA 230b may be simplified to reduce production costs. In addition, there may be no affect due to a delay since the CPU 21 and the power supply controller 221b are directly coupled.

[D] Other Embodiments

The present disclosure is not limited to the above-described embodiments but may be modified and practiced in different ways without departing from the spirit and scope of the present disclosure. Individual configurations and individual processes of the above embodiments may be selected or properly combined as necessary. Although monitoring of the VID value transmitted from the CPU 21 to the power supply controller 221 has been described in the above embodiments, the present disclosure is not limited thereto. For example, the FPGA 230 may monitor a VID value sent from the IOC 26 to the power supply controller 221. In this case, the monitor 235 sets a margin for each monitored target.

According to some embodiments of the relaying devices of the present disclosure, efficient bi-directional data communication between an upper level device and a power controller can be achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relaying device for relaying serial communication that couples an upper level device and a power supply controller, the relaying device comprising:
   a control information transmitter configured to receive control information that is output from the upper level device and check whether the control information is a voltage identification (VID) signal notification command; and
   a monitoring and controlling unit configured to monitor and control a control value to be transmitted to the power supply controller based on the control information transmitted from the control information transmitter,
   wherein the control information transmitter is configured to transmit the voltage identification (VID) signal notification command to the monitoring and controlling unit when the control information is the voltage identification (VID) signal notification command, and transmit the control information that is not the voltage identification (VID) signal notification command to the power supply controller when the control information is not the voltage identification (VID) signal notification command.

2. The relaying device of claim 1, wherein the control information transmitter, in response to receiving a command that is output from the upper level device to the power supply controller, performs a responding operation to the command.

3. The relaying device of claim 2, further comprising,
   an information storage configured to store power supply control information on the power supply controller,
   wherein in response to an information acquisition request command for the power supply controller from the upper level device, the control information transmitter responds to the upper level device with the power supply controller information read from the information storage.

4. The relaying device of claim 3, further comprising,
a storage processor configured to acquire the power supply control information from the power supply controller and store the power supply controller information in the information storage.

5. The relaying device of claim 1, further comprising,
a control value transmitter configured to transmit the control value, to the power supply controller, which is output from the monitoring and controlling unit.

6. The relaying device of claim 1, wherein the upper level device and the power supply controller are coupled by the serial communication, and
wherein information branched from the serial communication is input to the control information transmitter.

7. The relaying device of claim 1, wherein the monitoring and controlling unit includes a holding unit configured to hold a margin control value based on the control information, and performs the voltage margin control based on the margin control value in the holding unit.

8. The relaying device of claim 1, wherein the control information that is not the voltage identification (VID) signal notification command is at least one of a power supply controller information acquisition command and a clock signal.

9. A relaying method of serial communication in a relaying device coupling an upper level device and a power supply controller, the method comprising:
receiving control information that is output from the upper level device and checking whether the control information is a voltage identification (VID) signal notification command; and
monitoring and controlling, in a monitoring and controlling unit, a control value to be transmitted to the power supply controller based on the control information from the upper level device,
wherein the voltage identification (VID) signal notification command is transmitted to the monitoring and controlling unit when the control information is the voltage identification (VID) signal notification command, and the control information that is not the voltage identification (VID) signal notification command is transmitted to the power supply controller when the control information is not the voltage identification (VID) signal notification command.

10. The relaying method of claim 9, further comprising,
performing a responding operation, in response to receiving a command that is output from the upper level device to the power supply controller, to the command.

11. The relaying method of claim 10, further comprising:
storing power supply controller information on the power supply controller; and
responding, in response to an information acquisition request command for the power supply controller from the upper level device, to the upper level device with the stored power supply controller information.

12. The relaying method of claim 11, further comprising,
storing the power supply controller information in an information storage, which is acquired from the power supply controller.

13. The relaying method of claim 9, further comprising,
transmitting the control value to the power supply controller, which is output from the monitoring and controlling unit.

14. The relaying method of claim 9, wherein the upper level device and the power supply controller are coupled by the serial communication, and
wherein information branched from the serial communication is received.

15. The relaying method of claim 9, further comprising:
holding a margin control value based on the control information; and
performing the voltage margin control based on the margin control value.

16. The relaying method of claim 9, wherein the control information that is not the voltage identification (VID) signal notification command is at least one of a power supply controller information acquisition command and a clock signal.

17. A power control system comprising:
an upper level device;
a power supply controller; and
a relaying device configured to relay serial communication that couples the upper level device and the power supply controller, the relaying device includes:
a control information transmitter configured to receive control information that is output from the upper level device and check whether the control information is a voltage identification (VID) signal notification command; and
a monitoring and controlling unit configured to monitor and control a control value to be transmitted to the power supply controller based on the control information transmitted from the control information transmitter,
wherein the control information transmitter is configured to transmit the voltage identification (VID) signal notification command to the monitoring and controlling unit when the control information is the voltage identification (VID) signal notification command, and transmit the control information that is not the voltage identification (VID) signal notification command to the power supply controller when the control information is not the voltage identification (VID) signal notification command.

18. The power control system of claim 17, wherein the control information that is not the voltage identification (VID) signal notification command is at least one of a power supply controller information acquisition command and a clock signal.

* * * * *